(12) United States Patent
Ben-Eli

(10) Patent No.: US 8,731,119 B2
(45) Date of Patent: May 20, 2014

(54) APPARATUS AND METHOD FOR REDUCING RECEIVER FREQUENCY ERRORS

(75) Inventor: David Ben-Eli, Modiin (IL)

(73) Assignee: Marvell World Trade Ltd., St. Michael (BB)

( * ) Notice: Subject to any disclaimer, the term of this patent is extended or adjusted under 35 U.S.C. 154(b) by 48 days.

(21) Appl. No.: 13/423,220

(22) Filed: Mar. 18, 2012

(65) Prior Publication Data

US 2012/0236920 A1 Sep. 20, 2012

Related U.S. Application Data

(60) Provisional application No. 61/454,435, filed on Mar. 18, 2011.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl.
USPC ............................ 375/346; 375/285; 375/316

(58) Field of Classification Search
USPC ........................................................ 375/346
See application file for complete search history.

(56) References Cited

U.S. PATENT DOCUMENTS

| | | | |
|---|---|---|---|
| 4,453,834 A | 6/1984 | Suzuki et al. | |
| 5,659,884 A | 8/1997 | Daughtry et al. | |
| 5,757,244 A | 5/1998 | Nonaka et al. | |
| 5,883,550 A | 3/1999 | Watanabe et al. | |
| 5,953,648 A | 9/1999 | Hutchison et al. | |
| 6,522,212 B1 | 2/2003 | Kodim | |
| 6,636,121 B2 | 10/2003 | Barak et al. | |
| 6,985,705 B2 | 1/2006 | Shohara | |
| 7,221,921 B2 | 5/2007 | Maligeorgos et al. | |
| 7,403,078 B2 | 7/2008 | Routama et al. | |
| 7,466,209 B2 | 12/2008 | Babitch | |
| 7,548,130 B2 | 6/2009 | Kobayashi | |
| 7,728,684 B2 | 6/2010 | Tozer | |
| 8,031,024 B1 | 10/2011 | Zaslavsky | |
| 2002/0158693 A1 | 10/2002 | Soong et al. | |
| 2003/0144020 A1* | 7/2003 | Challa et al. | ................... 455/522 |

(Continued)

FOREIGN PATENT DOCUMENTS

| | | |
|---|---|---|
| GB | 2368235 A | 4/2002 |
| WO | 0133870 A2 | 5/2001 |
| WO | 0247281 A1 | 6/2002 |
| WO | 2005099107 A1 | 10/2005 |

OTHER PUBLICATIONS

U.S. Appl. No. 12/394,056 Official Action dated Jun. 10, 2010.
U.S. Appl. No. 12/394,056 Official Action dated Dec. 1, 2010.

(Continued)

*Primary Examiner* — Erin File

(57) ABSTRACT

A method in a receiver includes receiving from a transmitter an instruction to check for messages from the transmitter at intervals having a specified time period. A frequency error of the receiver relative to the transmitter is estimated at the receiver, and an actual time period that does not exceed the specified time period is selected based on the estimated frequency error. The receiver is activated periodically according to the selected actual time period so as to reset the frequency error.

17 Claims, 2 Drawing Sheets

(56) References Cited

U.S. PATENT DOCUMENTS

| | | | |
|---|---|---|---|
| 2005/0093638 A1 | 5/2005 | Lin et al. | |
| 2007/0178875 A1* | 8/2007 | Rao et al. | 455/343.1 |
| 2009/0195322 A1 | 8/2009 | Yan et al. | |
| 2010/0331019 A1* | 12/2010 | Bhattacharjee et al. | 455/458 |
| 2011/0261909 A1* | 10/2011 | Andgart et al. | 375/341 |
| 2011/0306315 A1* | 12/2011 | Subrahmanya et al. | 455/226.1 |
| 2012/0069800 A1* | 3/2012 | Soliman et al. | 370/329 |

OTHER PUBLICATIONS

U.S. Appl. No. 12/394,056 Official Action dated Sep. 21, 2010.

U.S. Appl. No. 13/423,221, filed Mar. 18, 2012.

3GPP TS 25.211, "3rd Generation Partnership Project; Technical Specification Group Radio Access Network; Physical channels and mapping of transport channels onto physical channels (FDD) (Release 6)", V6.10.0, Chapter 5, Sep. 2009.

3GPP TS 25.214, "3rd Generation Partnership Project; Technical Specification Group Radio Access Network; Physical layer procedures (FDD) (Release 6)", V6.11.0, Annex C, Dec. 2006.

3GPP TS 25.304, "3rd Generation Partnership Project; Technical Specification Group Radio Access Network; User Equipment (UE) procedures in idle mode and procedures for cell reselection in connected mode (Release 9)", V9.3.0, Sep. 2010.

3GPP TS 36.304, "3rd Generation Partnership Project; Technical Specification Group Radio Access Network; Evolved Universal Terrestrial Radio Access (E-UTRA); User Equipment (UE) procedures in idle mode (Release 9)", V9.5.0, Dec. 2010.

3GPP TS 43.022, "3rd Generation Partnership Project; Technical Specification Group GSM/EDGE Radio Access Network; Functions related to Mobile Station (MS) in idle mode and group receive mode (Release 9)", V9.2.0, Sep. 2010.

Nihon Dempa Kogyo Co. Ltd., "NX3225SA Crystal Unit", Data Sheet, Nov. 14, 2011.

European Patent Application # 121600266.6 Extended Search Report dated Aug. 21, 2012.

U.S. Appl. No. 13/189,595 Office Action dated Apr. 29, 2013.

* cited by examiner

APPARATUS AND METHOD FOR REDUCING RECEIVER FREQUENCY ERRORS

CROSS-REFERENCE TO RELATED APPLICATIONS

This application claims the benefit of U.S. Provisional Patent Application 61/454,435, filed Mar. 18, 2011, whose disclosure is incorporated herein by reference.

FIELD OF THE DISCLOSURE

The present invention relates generally to communication systems, and particularly to methods and systems for mitigating frequency errors between transmitters and receivers.

BACKGROUND

Some communication systems operate mobile communication terminals intermittently, such as in a discontinuous reception (DRX) mode in which the terminal activates its receiver for short durations in accordance with a specified cycle. DRX operation in Global System for Mobile communications (GSM) is specified, for example, in "3rd Generation Partnership Project; Technical Specification Group GSM/EDGE Radio Access Network; Functions Related to Mobile Station (MS) in Idle Mode and Group Receive Mode (Release 10)," TS 43.022, version 9.2.0, September, 2010, which is incorporated herein by reference.

In Universal Mobile Telecommunications System (UMTS), the DRX mode is specified in "3rd Generation Partnership Project; Technical Specification Group Radio Access Network; User Equipment (UE) Procedures in Idle Mode and Procedures for Cell Reselection in Connected Mode (Release 9)," TS 25.304, version 9.3.0, September, 2010, which is incorporated herein by reference.

DRX operation in Long-Term Evolution (LTE) systems is specified in "3rd Generation Partnership Project; Technical Specification Group Radio Access Network; Evolved Universal Terrestrial Radio Access (E-UTRA); User Equipment (UE) Procedures in Idle Mode (Release 9)," TS 36.304, version 9.5.0, December, 2010, which is incorporated herein by reference.

Some wireless communication terminals use crystal oscillators as reference sources, such as for generating a reference clock for producing Local Oscillator (LO) signals and/or as a time base for various signal processing operations. When a terminal operates intermittently, such as in DRX mode, high accuracy may be required from the terminal's reference clock source.

The description above is presented as a general overview of related art in this field and should not be construed as an admission that any of the information it contains constitutes prior art against the present patent application.

SUMMARY

An embodiment that is described herein provides a method in a receiver. The method includes receiving from a transmitter an instruction to check for messages from the transmitter at intervals having a specified time period. A frequency error of the receiver relative to the transmitter is estimated at the receiver, and an actual time period that does not exceed the specified time period is selected based on the estimated frequency error. The receiver is activated periodically according to the selected actual time period so as to reset the frequency error.

In some embodiments the method includes, in addition to activating the receiver according to the selected actual time period, activating the receiver and checking for the messages from the transmitter periodically according to the specified time period. In an embodiment, activating the receiver according to the specified time period includes activating the receiver for a first time duration, and activating the receiver according to the selected actual time period includes activating the receiver for a second time duration that is shorter than the first time duration.

In a disclosed embodiment, estimating the frequency error includes down-converting signals received from the transmitter using an uncompensated crystal oscillator, and assessing in the down-converted signals the frequency error that is caused at least partly by the uncompensated crystal oscillator. In another embodiment, selecting the actual time period includes selecting the actual time period to be sufficiently short so as not to exceed a maximum frequency error specified for the receiver.

In yet another embodiment, the method includes assessing a change in the frequency error between a first actual time period and a second actual time period, and estimating the frequency error for the second actual time period based on the change. In still another embodiment, selecting the actual time period includes decreasing the actual time period when the estimated frequency error exceeds an upper frequency threshold, and increasing the actual time period when the estimated frequency error is below a lower frequency threshold. In an embodiment, the upper frequency threshold and the lower frequency threshold are set based on the specified time period.

In some embodiments the method includes, upon activating the receiver according to the selected actual time period but failing to successfully measure a signal from the transmitter on a first frequency, re-attempting to measure the signal on one or more second frequencies that are offset relative to the first frequency. In other embodiments the method includes, upon activating the receiver according to the selected actual time period but failing to successfully measure a signal from the transmitter by coherently processing reference signals carried by the signal over a first coherent integration period, re-attempting to measure the signal by coherently processing the reference signals over a second coherent integration period, smaller than the first coherent integration period.

There is additionally provided, in accordance with an embodiment that is described herein, apparatus including a receiver and control circuitry. The receiver is configured to receive from a transmitter an instruction to check for messages from the transmitter at intervals having a specified time period, and to estimate a frequency error of the receiver relative to the transmitter. The control circuitry is configured to select, based on the estimated frequency error, an actual time period that does not exceed the specified time period, and to activate the receiver periodically according to the selected actual time period so as to reset the frequency error.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
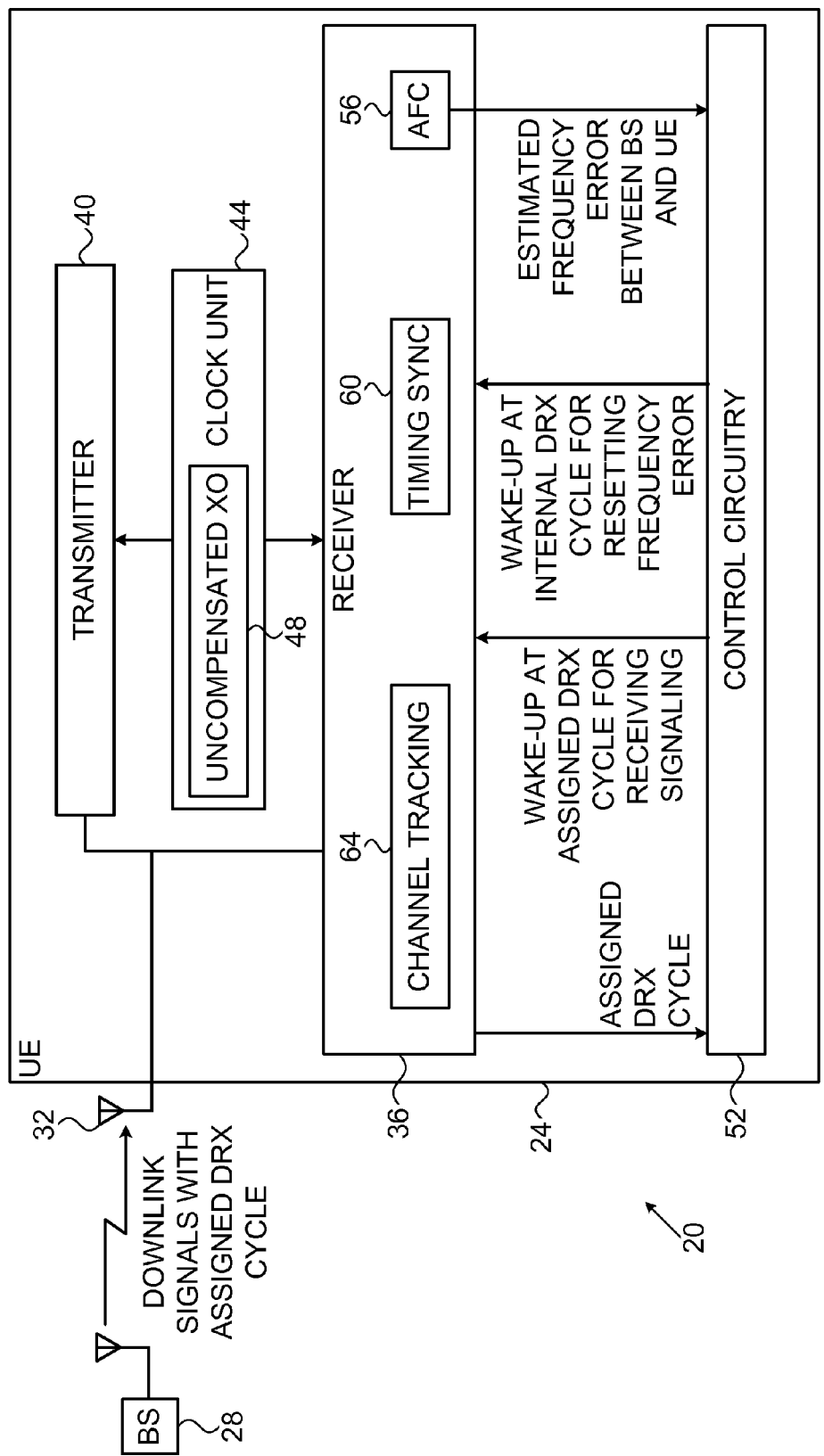
FIG. 1 is a block diagram that schematically illustrates a wireless communication system, in accordance with an embodiment that is described herein.

Various communication protocols require that the clocks of a base station and of a mobile communication terminal meet a certain synchronization requirement. This sort of synchronization is required, for example, to ensure that any frequency offset and time drift between the base station and the terminal remain acceptably small. The Global System for Mobile communications (GSM), Universal Mobile Telecommunications System (UMTS) and Long-Term Evolution (LTE) cellular standards, for example, require that the base station use a clock source whose absolute accuracy is ±0.05 ppm, and that the terminal track the base station clock with an error of no more than ±0.1 ppm. This synchronization accuracy is typically required over the entire operating temperature range of the terminal, e.g., over a temperature range from −30° C. to +70° C.

Meeting the synchronization accuracy described above is particularly challenging when the receiver in the terminal operates intermittently and therefore does not continuously track the signals transmitted by the base station. For example, the GSM, UMTS and LTE specifications each define a discontinuous reception (DRX) mode, in which the terminal activates its receiver and checks for possible signaling transmissions from the base station only in intermittent time intervals. At other times the receiver is deactivated in order to conserve battery power. The DRX mode is typically used when the terminal is in idle state, i.e., when it is not engaged in active communication.

Embodiments that are described herein provide improved methods and systems for synchronizing a terminal to the base station clock during DRX operation. The disclosed techniques are particularly suitable for use in a terminal that employs a low-cost and lower-accuracy uncompensated crystal oscillator as a clock source, as opposed, for example, to using a higher-cost and higher-accuracy Temperature-Compensated Crystal Oscillator (TCXO).

In some embodiments, the terminal is instructed by the base station to operate in discontinuous reception, i.e., to check for messages from the base station at intervals having a specified time period. The specified time period, also referred to as an assigned DRX cycle, is provided to the terminal by the base station. The terminal activates its receiver periodically in accordance with the assigned DRX cycle as instructed by the base station.

In an embodiment, in addition to operating in accordance with the assigned DRX cycle, the terminal activates its receiver for synchronizing with the base station clock in accordance with an internally-selected DRX cycle. The internal DRX cycle, also referred to herein as an "actual time period," is smaller than or equal to the assigned DRX cycle. In some embodiments the internal DRX cycle is set independently of the assigned DRX cycle. The base station is typically unaware of the internal DRX cycle. In some embodiments, the terminal estimates the frequency error of its receiver relative to the base station, and selects the internal DRX cycle based on the estimated frequency error. In some embodiments the terminal continually estimates the frequency error relative to the base station, and adapts the internal DRX cycle accordingly.

Since the internal DRX cycle may be selected to be smaller than the assigned DRX cycle, the terminal is able to re-synchronize its clock with the base station clock (and thus reset the frequency error to some minimal residual value) at short intervals. The terminal is therefore able to meet the specified synchronization accuracy regardless of the assigned DRX cycle, even when using an uncompensated crystal oscillator as a clock source. In one example embodiment, the terminal meets a synchronization accuracy of ±0.1 ppm while using a low-cost crystal oscillator whose accuracy is on the order of ±11 ppm over the −30° C. to +70° C. temperature range.

Terminals that use the disclosed techniques can be manufactured at low cost, for example because of the lower cost of uncompensated crystal oscillators and because there is no need to calibrate the terminal clock frequency over temperature. Moreover, the disclosed techniques eliminate the need for temperature sensors and temperature measurements for performing frequency correction.

FIG. 1 is a block diagram that schematically illustrates a wireless communication system 20, in accordance with an embodiment that is described herein. In the present example, system 20 comprises a cellular system that operates in accordance with the UMTS specifications. In alternative embodiments, system 20 may operate in accordance with any other suitable communication standard or protocol that supports discontinuous reception, such as, for example, LTE or GSM.

In the example of FIG. 1, system 20 comprises a mobile communication terminal 24 (referred to in UMTS terminology as User Equipment—UE) that communicates with a base station 28 (referred to in UMTS terminology as NodeB). This choice is made, however, purely by way of example. In real-life configurations, system 20 typically comprises a large number of base stations and a large number of terminals. Terminal 24 may comprise, for example, a cellular phone, a wireless-enabled computing device or any other suitable type of communication terminal.

In the embodiment of FIG. 1, terminal 24 comprises at least one antenna 32 for receiving Radio Frequency (RF) downlink signals from base station 28 and for transmitting RF uplink signals to the base station. A receiver 36 receives the downlink signals via antenna 32, down-converts the signals and extracts downlink data from the signals. A transmitter 40 produces uplink signals, up-converts them to RF and transmits the RF uplink signals via antenna 32. Control circuitry 52 manages the operation of terminal 24. A clock unit 44 provides one or more clock signals to receiver 36 and transmitter 40. The clock signals are used, for example, for generating Local Oscillator (LO) signals for down-conversion and/or up-conversion, and for generating sampling clocks for analog-to-digital and/or digital-to-analog conversion in the receiver and transmitter.

In the present example, clock unit 44 comprises an uncompensated crystal oscillator (XO) 48 that is used as a clock reference for the (one or more) clock signals produced by the clock unit. In the present context, the term "uncompensated" means that XO 48 has no internal circuitry for correcting frequency errors due to temperature variations, such as mechanisms used in TCXOs and Voltage-Controlled TXCOs (VCTCXOs). In an embodiment, XO 48 comprises an AT-cut XO such as the NX3225DA XO, available from Nihon Dempa Kogyo Co. (NDK) of Japan, whose frequency accuracy is specified as ±11 ppm over the temperature range of −20° C. to +80° C. In alternative embodiments, XO 48 may comprise any other suitable XO.

Typically, the performance of various units and mechanisms in receiver 36 depends on the frequency error of terminal 24 relative to base station 28. In the present example, receiver 36 comprises an Automatic Frequency Control (AFC) unit 56, which tracks the frequency of the base station downlink signal and corrects the clock frequency of terminal 24 so as to minimize the frequency error. Typically, AFC unit 56 has a certain lock range, i.e., a maximum initial frequency error that it is able to correct. If the frequency error exceeds the lock range, AFC unit 56 may not be able to synchronize and track the base station signal. When operating in DRX mode, the AFC unit should synchronize to the base station signal in the presence of the initial frequency error each time the receiver is activated.

As another example, receiver 36 comprises a timing synchronization unit 60, which adjusts the timing of terminal 24 so as to cancel timing drift relative to base station 28. Such timing drift may be caused, for example, by changes in distance between the terminal and the base station, by changes in the communication channel between the terminal and the base station, and/or by clock drift in the terminal and the base station. In a typical UMTS receiver, timing synchronization unit 60 detects known signals in the received downlink signal (e.g., Primary Common Pilot Channels—P-CPICH) and performs coherent correlation over these signals. The length of the correlation, however, is limited by the frequency error between the terminal and the base station.

Therefore, the performance of timing synchronization unit 60 is dependent upon the frequency error. When operating in DRX mode, the timing synchronization unit should synchronize to the base station signal in the presence of the initial timing drift each time the receiver is activated. In an example embodiment, the initial frequency error is limited to approximately 500 Hz, or other suitably small error.

As yet another example, receiver 36 comprises a channel tracking unit 64, which tracks and compensates for channel response variations due to Doppler shift. These variations are typically up to several hundred Hz, e.g., 200 Hz. In addition to Doppler-related channel variations, any residual frequency error that is not compensated for by AFC unit 56 typically will be perceived as channel variations by channel tracking unit 64. Unit 64 typically has a maximum operating bandwidth of several hundred Hz, and may fail if the combination of the Doppler shift and frequency error exceeds this bandwidth.

Units 56, 60 and 64 are described above purely by way of example. In alternative embodiments, receiver 36 comprises any other suitable unit or mechanism whose performance depends on the frequency error of terminal 24 relative to base station 28.

As noted above, in some embodiments terminal 24 operates in a discontinuous reception (DRX) mode when in idle state. In this mode, terminal 24 is instructed by base station 28 to activate its receiver and check for downlink signaling only for short durations, at intermittent time intervals in accordance with a specified period. The period specified by the base station is referred to as an assigned DRX cycle. The receiver in the terminal is not required to track the base station downlink signal during the inactivity periods between successive activations, in an embodiment, and therefore a frequency error develops during each inactivity period.

When the terminal activates its receiver following an inactivity period, the receiver should re-synchronize with the base station signal despite the presence of possible initial frequency error that may have developed during the inactivity period. The various receiver units (e.g., AFC unit 56, timing synchronization unit 60 and channel tracking unit 64) should be able to acquire the base station signal in the presence of this initial frequency error in order to re-synchronize.

The initial frequency error immediately following activation of the receiver depends, for example, on the length of the preceding inactivity period, on the temperature/time gradient of the terminal (i.e., terminal temperature changes over time), and on the frequency/temperature gradient of XO 48 (i.e., XO frequency changes with temperature). In an example embodiment, the temperature/time gradient of the terminal can reach up to 0.5° C./second, and the frequency/temperature gradient of XO 48 can reach up to 0.6 ppm/° C. Alternatively, however, any other suitable gradients can be used.

For the example gradients above, the table below gives the maximum frequency error between the base station and the terminal, which develops between successive DRX activations, as a function of the DRX cycle:

TABLE 1

Maximum frequency error for various DRX cycles

| DRX cycle [sec] | Maximum frequency error [ppm] | Maximum frequency error in 2 GHz band [Hz] |
| --- | --- | --- |
| 0.64 | 0.192 | 384 |
| 1.28 | 0.384 | 768 |
| 2.56 | 0.768 | 1536 |
| 5.12 | 1.536 | 3072 |

In practice, as noted above, typically it is desirable to keep the frequency error on the order of several hundred Hz, e.g., below 500 Hz. As can be seen in the table above, the actual frequency error exceeds this desired value in several scenarios.

In some embodiments, control circuitry 52 maintains the frequency error of terminal 24 within a tolerable range, by activating the receiver in accordance with a shorter internal DRX cycle, in addition to the assigned DRX cycle specified by the base station. This mechanism is described in detail below. In an embodiment, control circuitry 52 estimates the actual frequency error between the base station and the terminal, e.g., by obtaining from AFC unit 56 frequency error measurements performed on received and down-converted downlink signals. In an embodiment, control circuitry 52 selects the internal DRX cycle based on the actual frequency error, e.g., by looking up a table that holds internal DRX cycles for various actual frequency errors, or by adaptively increasing or decreasing the internal DRX cycle relative to the currently-used cycle.

The terminal configuration shown in FIG. 1 is an example configuration, which is depicted in a highly simplified manner solely for the sake of clarity. In alternative embodiments, any other suitable terminal configuration can be used. Terminal elements that are not mandatory for understanding of the disclosed techniques have been omitted from the figure for the sake of clarity. Further aspects of operating wireless communication terminals using uncompensated crystal oscillators are described, for example, in U.S. Pat. No. 8,031,024, whose disclosure is incorporated herein by reference.

In various embodiments, some or all of the elements of terminal 24, including receiver 36, transmitter 40, clock unit 44 and control circuitry 52, are implemented in hardware, such as implementing elements of the transmitter and receiver using one or more Radio Frequency Integrated Circuits (RFICs), or implementing the elements of the transmitter, the receiver and/or the control circuitry using one or more Field-Programmable Gate Arrays (FPGAs) or Application-Specific Integrated Circuits (ASICs). In alternative embodiments, certain elements of terminal 24 are implemented in software, or using a combination of hardware and software elements.

In some embodiments, certain terminal elements, such as certain elements of control circuitry 52, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, control circuitry 52 selects and applies an internal DRX cycle in terminal 24, in addition to the assigned DRX cycle specified by base station 28. The internal DRX cycle is typically shorter than (or at least does not exceed) the assigned DRX cycle, and therefore enables only a smaller frequency error to develop.

In the example of FIG. 1, control circuitry 52 accepts the assigned DRX cycle from receiver 36. The control circuitry produces two periodic wake-up signals to receiver 36. One wake-up signal activates the receiver periodically in accordance with the assigned DRX signal, and the other wake-up signal activates the receiver periodically in accordance with the internal DRX signal.

In each receiver activation of the internal DRX cycle, terminal 24 re-synchronizes its receiver to the base station signal. In each activation of the assigned DRX cycle, terminal 24 re-synchronizes its receiver and also checks for signaling messages from the base station. Thus, the activations of the internal DRX cycle are typically shorter than those of the assigned DRX cycle.

In some embodiments, although not necessarily, the internal DRX cycle is chosen as an integer divisor of the assigned DRX cycle—Such that each receiver activation of the assigned DRX cycle also serves as an activation of the internal DRX cycle. In an example embodiment, for an assigned DRX cycle of 2.56 seconds, control circuitry 52 sets the internal DRX cycle between 0.64-2.56 seconds. Alternatively, any other suitable range of internal DRX values can be used.

In some embodiments, control circuitry 52 selects the internal DRX cycle by estimating the actual frequency error of the terminal relative to the base station. The control circuitry typically increases the internal DRX cycle when the actual frequency error is small, and vice versa. Control circuitry 52 typically accepts the estimated frequency error from AFC unit 56. This mechanism enables the terminal to adapt the internal DRX cycle to match the actual frequency error, rather than the maximum possible frequency error. The adaptation therefore reduces the additional power consumption caused by the additional receiver activations of the internal DRX cycle.

Figure 2:
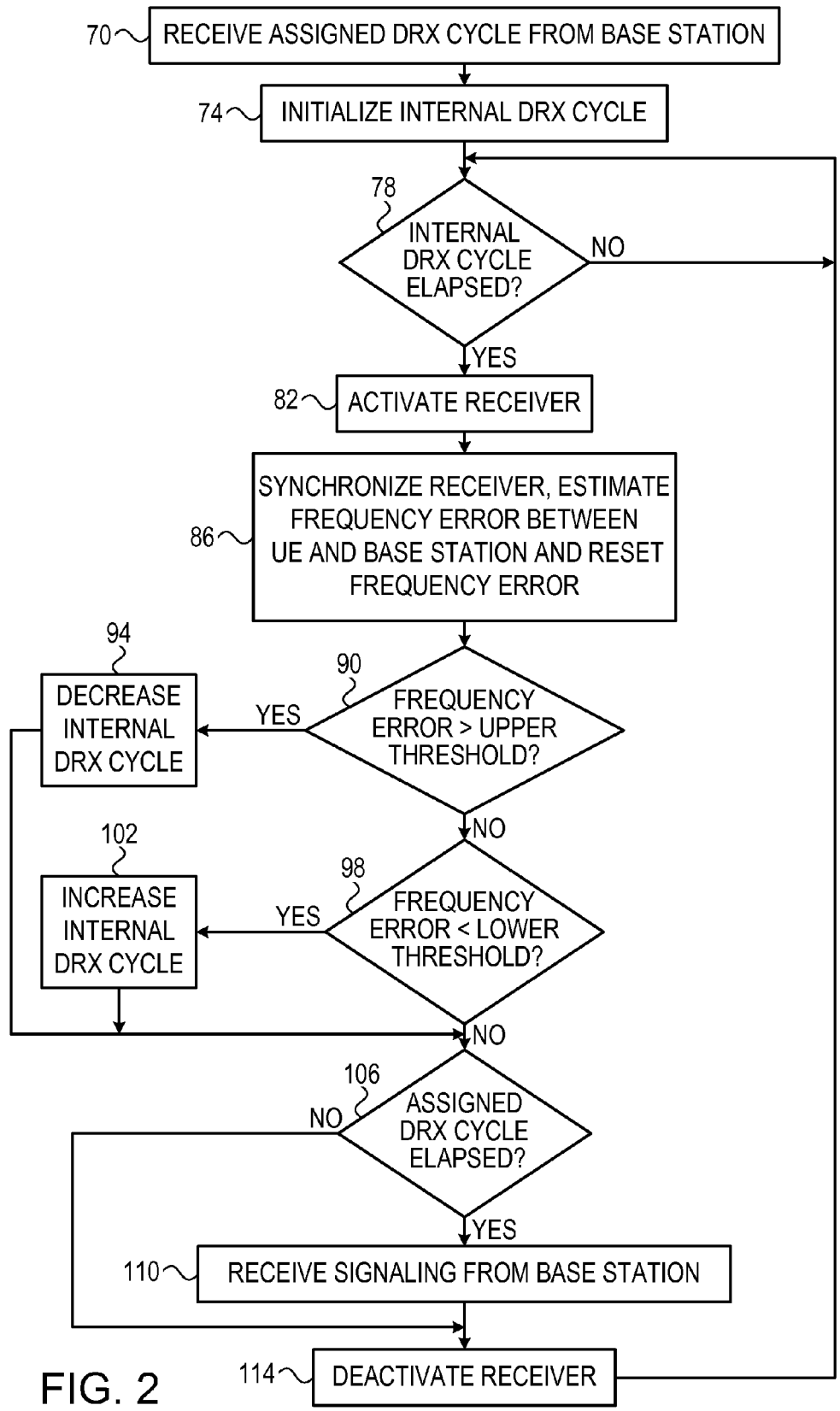
FIG. 2 is a flow chart that schematically illustrates a method for discontinuous reception (DRX) in a mobile communication terminal, in accordance with an embodiment that is described herein.

FIG. 2 is a flow chart that schematically illustrates a method for discontinuous reception in terminal 24, in accordance with an embodiment that is described herein. The method begins with terminal 24 receiving an instruction from base station 28 to operate in DRX mode in accordance with an assigned DRX cycle, at an assigned DRX input operation 70. Receiver 36 of terminal 24 reports the assigned DRX cycle to control circuitry 52.

Control circuitry 52 initializes the internal DRX cycle, at an initialization operation 74. Typically, the control circuitry initially selects a small internal DRX cycle, which will enable the receiver to re-synchronize to the base station clock even for the worst-case frequency error.

In an embodiment, the initial value of the internal DRX cycle is set based on known or estimated frequency error characteristics of the terminal (e.g., temperature/time gradient of the terminal and/or frequency/temperature gradient of the crystal oscillator). Considering these characteristics, the initial DRX cycle is typically selected such that the maximum frequency error experienced by the receiver will not exceed a certain threshold value.

In an example embodiment, if the assigned DRX cycle is 2.56 seconds, the control circuitry initializes the internal DRX cycle to 0.64 seconds. As can be seen in Table 1 above, this initial setting limits the possible frequency error at 384 Hz. In alternative embodiments, any other initial selection of internal DRX cycle can be used. The terminal receiver is assumed to be inactive at this stage.

Control circuitry 52 checks whether the inactivity period of the internal DRX cycle has elapsed, at an internal DRX checking operation 78. When the current inactivity period of the internal DRX cycle expires, control circuitry 52 activates receiver 36, at an activation operation 82.

Immediately following activation, receiver 36 synchronizes to the base station clock using the received downlink signal, at a synchronization operation 86. In an example embodiment, AFC unit 56 and timing synchronization unit 60 lock on the frequency and timing of the base station signal, respectively. Since the frequency error is relatively small, this synchronization is typically performed successfully and rapidly. In some embodiments, although not necessarily, channel tracking unit 64 acquires the current channel response. (Channel acquisition is not mandatory, since at this stage the receiver does not decode signaling from the base station.)

By synchronizing to the base station signal (in accordance with either the internal DRX cycle or the assigned DRX cycle), receiver 36 resets the frequency error relative to base station 28 to some minimal residual value (but typically not to zero). The residual frequency error depends, for example, on the channel conditions between the base station and the terminal, and the amount of time dedicated to the AFC. The residual frequency error is typically small enough, such that the receiver can handle it at the next wakeup period even with the additional drift during the DRX cycle.

In addition, control circuitry 52 now possesses an estimate of the frequency error that has developed over the recent inactivity period of the internal DRX cycle. For example, in an embodiment, control circuitry 52 assesses the difference between the frequency error before and after re-synchronizing with the base station. This difference is indicative of the frequency error that has developed over the recent inactivity period.

Control circuitry 52 checks whether the frequency error that developed over the recent inactivity period is larger than an upper threshold denoted FreqChangeToDecreaseDrx, at an upper threshold checking operation 90. If so (and as long as the internal DRX cycle is not below the minimum internal DRX cycle—0.64 seconds in the present example, although other values can be used in alternative embodiments) the control circuitry decreases the internal DRX cycle, at a cycle decreasing operation 94.

Otherwise, control circuitry 52 checks whether the frequency error that developed over the recent inactivity period is smaller than a lower threshold denoted FreqChangeToIncreaseDrx, at a lower threshold checking operation 98. If so (and as long as the internal DRX cycle does not exceed the assigned DRX cycle) the control circuitry increases the internal DRX cycle, at a cycle increasing operation 102.

Control circuitry 52 now checks whether the current inactivity period of the assigned DRX cycle (in the present example an integer multiple of the inactivity period of the internal DRX cycle) has elapsed, at an assigned DRX checking operation 106. If yes, the control circuitry instructs receiver 36 to check for signaling messages from base station 28, at a reception operation 110. In some embodiments, before checking for signaling messages, channel tracking unit 64 re-synchronizes with the current channel response between the base station and the terminal.

If the receiver identifies a signaling message indicating initiation of active communication, the terminal will typically exit the idle state (not shown in the figure). Otherwise, control circuitry 52 deactivates receiver 36, and the method loops back to operation 78 above in which the control circuitry waits for expiry of the next inactivity period of the internal DRX cycle. If assigned DRX checking operation 106 indicates that the inactivity period of the assigned DRX cycle has not expired, operation 110 is skipped.

In some embodiments, receiver activations in accordance with the internal DRX cycle involve fewer functions than receiver activations in accordance with the assigned DRX cycle. Typically, receiver activations in accordance with the internal DRX cycle involve re-synchronization with the base station but not checking for signaling messages. Receiver activations in accordance with the assigned DRX cycle, on the other hand, typically involve both re-synchronization and checking for (and possibly reception of) signaling messages. Therefore, receiver activations in accordance with the internal DRX cycle are typically shorter in duration than receiver activations in accordance with the assigned DRX cycle.

In various embodiments, control circuitry 52 sets the thresholds FreqChangeToIncreaseDrx and FreqChangeToDecreaseDrx in different ways. In an example embodiment, FreqChangeToIncreaseDrx is set such that the frequency error after increasing the internal DRX cycle will still be below the maximum tolerable value. For example, if control circuitry 52 intends to increase the internal DRX cycle by a factor of two, and the maximum tolerable frequency error is 500 Hz, then FreqChangeToIncreaseDrx is set to 250 Hz or slightly lower. FreqChangeToDecreaseDrx can be set, for example, to 600 Hz. In alternative embodiments, any other suitable setting of the FreqChangeToIncreaseDrx and FreqChangeToDecreaseDrx can be used.

In some embodiments, upon entry to the idle state, control circuitry 52 activates receiver 36 for a time duration denoted MinimalOnTime. The setting of MinimalOnTime may depend on the state the terminal originated from (e.g., FACH, DCH), and on the measured temperature.

In some embodiments, if receiver 36 is unable to identify and successfully measure a valid downlink signal during an activation of the internal DRX cycle, the receiver performs one or more additional reception and measurement attempts using higher frequency offsets, in order to try and lock AFC unit 56. In an example embodiment, receiver 36 performs two additional reception attempts with frequency offsets of +1 KHz and −1 KHz relative to the initial reception frequency. Additionally or alternatively, the receiver may attempt to shorten the coherent integration period of timing synchronization unit 60, e.g., from eight reference signals (e.g., P-CPICH symbols in UMTS, for example) to four reference signals. Shortening the coherent integration period over which reference signals are integrated will typically increase the receiver immunity to frequency errors.

In some embodiments, the increasing and decreasing of the internal DRX cycle is performed in an additive manner, i.e., by adding or subtracting a certain value to or from the inactivity period of the internal DRX cycle. In alternative embodiments, the increasing and decreasing of the internal DRX cycle is performed in a multiplicative manner, i.e., by multiplying or dividing the inactivity period of the internal DRX cycle by a certain value.

In some embodiments, the thresholds FreqChangeToIncreaseDrx and FreqChangeToDecreaseDrx are variable, e.g., depend on the assigned DRX cycle. In this embodiment, operation 74 of FIG. 2 typically comprises setting of these thresholds as a function of the assigned DRX cycle received from the base station.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a receiver, receiving from a transmitter an instruction to check for messages from the transmitter at intervals having a specified time period;
estimating at the receiver a frequency error of the receiver relative to the transmitter, by down-converting signals received from the transmitter using an uncompensated crystal oscillator and assessing in the down-converted signals the frequency error that is caused at least partly by the uncompensated crystal oscillator;
selecting, based on the estimated frequency error, an actual time period that does not exceed the specified time period; and
activating the receiver periodically according to the selected actual time period so as to reset the frequency error.

2. The method according to claim 1, comprising, in addition to activating the receiver according to the selected actual time period, activating the receiver and checking for the messages from the transmitter periodically according to the specified time period.

3. The method according to claim 2,
wherein activating the receiver according to the specified time period comprises activating the receiver for a first time duration, and
wherein activating the receiver according to the selected actual time period comprises activating the receiver for a second time duration that is shorter than the first time duration.

4. The method according to claim 1, wherein selecting the actual time period comprises selecting the actual time period to be sufficiently short so as not to exceed a maximum frequency error specified for the receiver.

5. The method according to claim 1, comprising assessing a change in the frequency error between a first actual time period and a second actual time period, and estimating the frequency error for the second actual time period based on the change.

6. The method according to claim 1, wherein selecting the actual time period comprises decreasing the actual time period when the estimated frequency error exceeds an upper frequency threshold, and increasing the actual time period when the estimated frequency error is below a lower frequency threshold.

7. The method according to claim 6, comprising setting the upper frequency threshold and the lower frequency threshold based on the specified time period.

8. A method, comprising:

in a receiver, receiving from a transmitter an instruction to check for messages from the transmitter at intervals having a specified time period;

estimating at the receiver a frequency error of the receiver relative to the transmitter, and selecting, based on the estimated frequency error, an actual time period that does not exceed the specified time period; and activating the receiver periodically according to the selected actual time period so as to reset the frequency error; and performing one of:
  upon activating the receiver according to the selected actual time period but failing to successfully measure a signal from the transmitter on a first frequency, re-attempting to measure the signal on one or more second frequencies that are offset relative to the first frequency; and
  upon activating the receiver according to the selected actual time period but failing to successfully measure the signal from the transmitter by coherently processing reference signals carried by the signal over a first coherent integration period, re-attempting to measure the signal by coherently processing the reference signals over a second coherent integration period, smaller than the first coherent integration period.

9. Apparatus, comprising:

an uncompensated crystal oscillator;

a receiver, which is configured to down-convert signals received from a transmitter using the uncompensated crystal oscillator, to receive from the transmitter an instruction to check for messages from the transmitter at intervals having a specified time period, and to estimate a frequency error of the receiver relative to the transmitter by assessing in the down-converted signals the frequency error that is caused at least partly by the uncompensated crystal oscillator; and control circuitry, which is configured to select, based on the estimated frequency error, an actual time period that does not exceed the specified time period, and to activate the receiver periodically according to the selected actual time period so as to reset the frequency error.

10. The apparatus according to claim 9, wherein the control circuitry is configured, in addition to activating the receiver according to the selected actual time period, to activate the receiver so as to check for the messages from the transmitter periodically according to the specified time period.

11. The apparatus according to claim 9, wherein the control circuitry is configured to select the actual time period to be sufficiently short so as not to exceed a maximum frequency error specified for the receiver.

12. The apparatus according to claim 9, wherein the control circuitry is configured to assess a change in the frequency error between a first actual time period and a second actual time period, and to estimate the frequency error for the second actual time period based on the change.

13. The apparatus according to claim 9, wherein the control circuitry is configured to decrease the actual time period when the estimated frequency error exceeds an upper frequency threshold, and to increase the actual time period when the estimated frequency error is below a lower frequency threshold.

14. The apparatus according to claim 9, wherein, upon activating the receiver according to the selected actual time period but failing to successfully measure a signal from the transmitter on a first frequency, the control circuitry is configured to cause the receiver to re-attempt measuring the signal on one or more second frequencies that are offset relative to the first frequency.

15. The apparatus according to claim 9, wherein, upon activating the receiver according to the selected actual time period but failing to successfully measure a signal from the transmitter by coherently processing reference signals carried by the signal over a first coherent integration period, the control circuitry is configured to cause the receiver to re-attempt measuring the signal by coherently processing the reference signals over a second coherent integration period, smaller than the first coherent integration period.

16. A mobile communication terminal comprising the apparatus of claim 9.

17. A chipset for processing signals in a mobile communication terminal, comprising the apparatus of claim 9.

* * * * *